April 14, 1959     L. E. DE NEERGAARD     2,882,516
RECORD SENSING SYSTEM Filed Oct. 29, 1952     5 Sheets-Sheet 1

FIG 4
CONTROL OR NULL POINT

Inventor
Leif Eric De Neergaard
by Parker & Carter
Attorneys

April 14, 1959

L. E. DE NEERGAARD 2,882,516

RECORD SENSING SYSTEM

Filed Oct. 29, 1952

Inventor
Leif Eric De Neergaard
by Parker & Carter
Attorneys

April 14, 1959

L. E. DE NEERGAARD

2,882,516

RECORD SENSING SYSTEM

Filed Oct. 29, 1952

Inventor
Leif Eric De Neergaard
by Parker & Carter
Attorneys April 14, 1959     L. E. DE NEERGAARD     2,882,516

RECORD SENSING SYSTEM

Filed Oct. 29, 1952     5 Sheets-Sheet 5

Inventor
Leif Eric De Neergaard
by Parker & Carter,
Attorneys

United States Patent Office 2,882,516
Patented Apr. 14, 1959

2,882,516
RECORD SENSING SYSTEM

Leif Eric de Neergaard, Madison, Wis., assignor to Frederic W. Olmstead, Washington, D.C., Hans W. Trechsel, Madison, Wis., Deryck A. Gerard, Minneapolis, and John J. Kojis, St. Louis Park, Minn., Norman S. Parker, Evanston, and Malcolm S. Bradway, Chicago, Ill., and said de Neergaard, as trustees; The Northern Trust Company, executor of said Leif E. de Neergaard, deceased Application October 29, 1952, Serial No. 317,467

43 Claims. (Cl. 340—174)

This invention alludes to magnetic pickups used in conjunction with magnetized recording tape and more specifically pertains to rotatable scanning devices capable of sensing any displacement of magnetized lanes or traces in directions transverse to the movement of a control record upon which the traces are impressed.

One object of the invention is to provide variations in a control signal responsive to deflections of magnetized traces transverse to the direction of displacement of a control recording tape.

Another object is the continuous generation of a variant control signal from a control record having intelligence or data impressed thereon for controlling desired movements in servo systems.

Another object is the provision of methods and means by whose use a variable reluctance magnetic scanning device can be made to provide a cyclic variation in reluctance in a magnetic circuit which includes a record, such that displacement of parallel recorded traces in directions transverse to the direction of movement of the record appears as a phase shift in the voltage derived from an induction coil associated with the circuit.

The rotatable magnetic pickups disclosed in the instant application are particularly adapted to pick up and translate intelligence recorded or impressed upon a control record in the general manner fully described in my co-pending application for United States Letters Patent, Serial No. 571,338, filed January 4, 1945, now Patent No. 2,628,539. This application illustrates and describes methods and means for recording linear or angular displacements in a basically new manner. This consists of impressing parallel, spaced flux transmissive traces along the length of a long strip of recording media, or near the periphery of a circular control record if such an element is used. During the recording process, displacements are imparted to these parallel traces in directions transverse to the direction of movement of the record by amounts exactly proportional to the movements being recorded from instant to instant. Thus, if the record medium is a long ribbon-like tape the flux transmissive parallel traces will be impressed along the recording tape in such a manner that they will be in absolute parallelism with the tape's edge at such instants that no displacement of the recording element is taking place. However, varying displacements measured transverse so the direction of feed of the recording tape or record are imparted to these traces by amounts and directions precisely proportional to the magnitude and direction of the displacement being recorded from instant to instant.

The rotatable magnetic scanning devices herein disclosed are intended to be used in conjunction with servo-systems which may be used, among other devices, to control the displacements of machine tool elements. By the use of these scanning devices operating in conjunction with the recording tapes just described, it is possible to continuously pick up a control signal from a recording tape independent of the recording tape's feed. Normally the control tape is fed at pre-selected rates. However, if the recording tape is being used to control the displacements of a lathe cutting tool, as an example, and the tool breaks, it is entirely practical to instantly stop the feed of the tape without losing or even attenuating the signal being picked up. Furthermore, this "holding" signal will be picked up as long as the control tape is stationary, thus making it possible for the operator to make necessary tool changes without in any way losing automatic control of the slidable tool supporting elements such as the slide and carriage of a lathe. Other valuable and useful results obtained by the use of the inventions herein disclosed will become manifest after study of the appended specification and drawings in which:

Figures 1 to 7 inclusive illustrate certain elements of a magnetic pickup disclosed in application for United States Letters Patent, Serial No. 571,338, filed January 4, 1945, now Patent No. 2,628,539.

This application is a continuation-in-part of that application.

Figure 1:
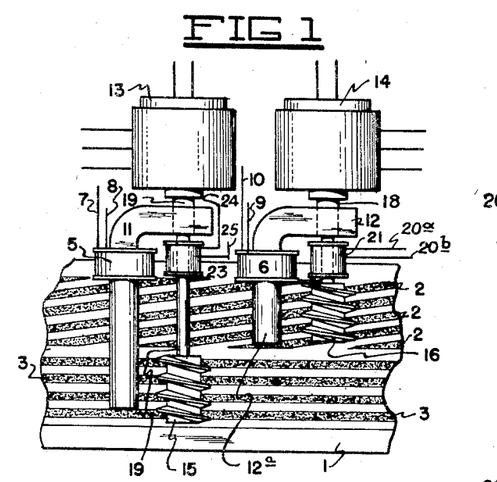
Figure 1 illustrates in plan two separate rotatable magnetic pickups, each adapted to sense displacements of magnetized traces impressed on a control record.

A section of a control record 1 is illustrated in Figure 1. It will be assumed that the record is continuously displaced from left to right as viewed in this figure. Figure 1 illustrates that the control record 1 is divided in substantially two areas extending along its length. Four parallel traces 2 occupy the upper area which will be hereafter alluded to as the Y—Y lane, or channel, while four parallel traces 3 occupy the lower half or X—X lane or channel of the record 1.

The X—X lane is adapted to represent control data of a variable such as a rate of movement in one direction and the Y—Y lane is adapted to represent control data of another variable such as a rate of movement in another direction, all as fully set forth in Patent No. 2,628,539.

The record 1 is preferably made of plastic such as a polymerzied derivative of methacrylic acid such as "Lucite" or "Plexiglas," although various other materials including stainless steel may be used. The width of this record may be taken to be some .500" wide, its thickness .240" while its length may be ten, a hundred or more feet in length dependent upon the length of a desired control cycle. The traces 2 and 3 may be grooves filled with powdered iron, Permalloy, Pemzalloy or other finely comminuted substance having high permeability. Loss of this powdered material which completely fills the grooves along their entire length is prevented by the application of a very thin film 4 of tough plastic such as "cellophane" which is cemented on the top surface of the record 1.

Figure 2:
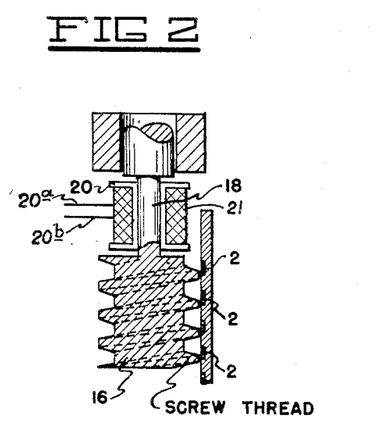
Figure 2 is a cross-section through one of the rotary pickups shown in Figure 1.
Figure 3:
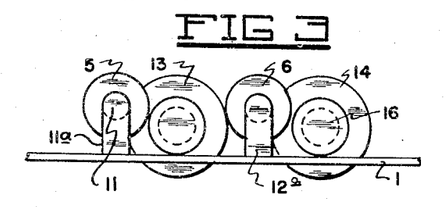
Figure 3 is an end elevation of the elements illustrated by Figure 1.

The output of an electronic oscillator (not shown) is led to the driving coil 5 by the leads 7 and 8. Similarly, the output of this oscillator is led to the driving coil 6 by the leads 9 and 10. The output of the oscillator may be an alternating current of some 2,000 or 3,000 cycles per second. The coils 5 and 6 consist of many turns of fine, enameled or otherwise insulated copper magnet wire. The driving coil 5 is wound about one leg of a flux bar 11 while the driving coil 6 is similarly positioned about a flux bar 12. The flux bars may be made of electrolytic or "Armco A" iron, certain types of "Permalloy," or any other material having a high transmissibility to alternating electro-magnetic flux whose frequency is approximately 2,000 or 3,000 c.p.s. The two flux bars are of the general shape indicated by the plan view, Figure 1. As may be seen from this figure, each of these members have the outline of an inverted L. The right-hand end of each horizontal leg, as viewed in Figure 1, is perpendicular to rotary pickups 15 and 16 which are substantially parallel to the vertical legs. The vertical leg of flux bar 11 extends downwardly, as viewed in this figure, to that area of the control record 1 occupied by the traces 3, while the vertical leg of flux bar 12 extends over that area of the control record 1 occupied by the traces 2. Figure 2 is a vertical cross-section taken through the axis of the bore provided in flux bar 12. Two "Selsyn" motors 13 and 14 serve to rotate the two pickups 15 and 16, respectively. These identical pickups are constituted of material similar to that from which the flux bars are made, and have V threads generated along their lengths. Their proportions are more or less similar to those illustrated and as shown may be double threads. The distance from any point on one thread to the same point on any adjacent thread, measured parallel to the pickup's axis is identical to the distance from the center of one trace to the center of an adjacent parallel trace on the record. The pickup 16 press-fitted on the end of a shaft 18 while the pickup is press-fitted on the end of a shaft 18 while the pickup shafts which are made of "Armco A" iron, Permalloy, or similar material, terminate at a point close to the housing of the "Selsyn" motors 13 and 14. As may be seen from Figure 2, a pickup coil 21 is positioned concentrically about the shaft 18. This coil consists of many turns of fine enameled magnet-wire wrapped about a spool 20 made of Bakelite or similar material. A pair of leads 20a and 20b lead from coil 21 to any suitable control circuit for controlling a variable such as the movement of a member. The pickup coil is stationary with a clearance between the spool's inner diameter and the small diameter section of the shaft 18. The shaft's diameter is increased where it passes through a bore of the flux bar 12. The shaft 18 is mounted concentric to and integral with the rotor shaft of Selsyn 14. A clearance of .001 or less is maintained between the flux bar's bore and the shaft. That section of flux bar 12 which extends over the area of the control record 1 occupied by the traces 2 of channel Y—Y, Figure 1, terminates in a dependent, integral leg 12a as illustrated by Figure 3. The end of this leg is ground to afford a smooth plane surface which bears against that area of the control record 1 occupied by the traces 2. The ferro-magnetic powder, filling the grooves cut in the upper half of the control record 1 as viewed in Figure 1, constitute the control traces 2. The surfaces of these traces are, therefore, continuously separated from the plane surface ground at the end of the vertical leg 12a by the thickness of the thin plastic strip 4, Figures 5, 6, and 7, cemented on the upper surface of the control record 1.

Flux bar 11 has a similar dependent integral leg 11a, as illustrated in Figure 3, with a smooth-surfaced terminal portion which bears against the traces 3. A coil 23 or induction element similar to coil 21 is disposed around shaft 19 with a pair of leads 24 and 25 which lead to any suitable control circuit for controlling a variable.

Figures 5, 6, 7:
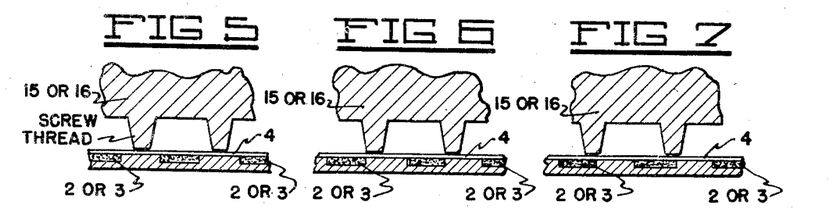
Figure 5 is a cross-section taken through certain flux sensing elements.
Figure 6 is a second cross-section through the flux sensing elements shown in Figure 5.
Figure 7 is a third cross-sectional study of the elements shown in Figures 5 and 6.

Figures 5, 6, and 7 represent the positioning of the ferrous threads, cut along the length of one of the rotatable pickups 15 or 16 in relation to the traces 2 or 3, with different angular displacements about its axis of rotation. Figure 5 illustrates these threads to be exactly midway between the channels 2 or 3. Therefore, with the driving coil of the circuit excited with high frequency alternating current the magnetic flux flowing in the circuit will have to pass through a non-magnetic, high reluctance path whose length is the distance between the threads of the pickup and the ferro-magnetic traces provided in the control record 1. With a slight angular movement in the proper direction of the pickup about its axis the threads will be brought closer to the traces 2 or 3 as illustrated by Figure 6 to decrease the length of the non-ferrous path through which flux threading the magnetic circuit must flow. Figure 7 illustrates a condition caused by a further rotation of the pickup in the same direction in which the threads of the pickup are in total register with the multiple parallel traces 2 or 3. With the threads in this relation to the traces the flux passing through the complete magnetic system will be at a maximum magnitude while the alternating current inductively built up in the pickup coil will also reach its maximum.

From the description, it will be seen that the functioning of the X—X and Y—Y flux gates illustrated by Figures 1, 2, and 3, each consisting of a rotatable threaded pickup shaft, flux bar, driving coil, pickup coil and cooperating flux conducting channels impressed along the length of the control record serve to control the amount of high frequency flux threading the whole magnetic circuit. Thus, the magnitude of the magnetic flux is continuously regulated from instant to instant by controlling the length of the high reluctance path existing between the flux conducting channels and the threads of the rotatable pickup.

Figure 4:
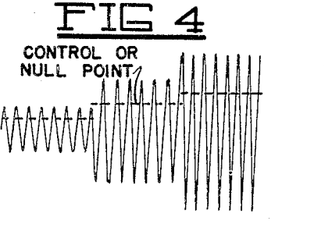
Figure 4 is a graphic illustration of certain signal levels.

Figure 4 is a graphical representation of the alternating current output of either of the pickup coils 21 or 23 and illustrates three current amplitudes corresponding to three different positions of the threads of a rotatable pickup relative to the ferro-magnetic channels as illustrated by Figures 5, 6, and 7. After necessary amplification, the output of the pickup coil is rectified as represented by the dash-dash line extending in steps across Figure 4. It will be assumed that the relative position of the threads of the pickup to the traces 2 or 3 shown in Figure 6 is the control point for the X—X and Y—Y systems. Therefore, a slight angular movement imparted to either pickup in one direction from this control point causes the distance between the threads of the pickups and the ferro-magnetic channels to be decreased as shown by Figure 7. Conversely, rotation of the pickup in the opposite direction causes the high reluctance gap between the traces and threads to be increased as illustrated by Figure 5.

The flux bar, shaft, pickup, and the ferro-magnetic material of the traces of the respective lanes jointly constitute a magnetic circuit since magnetic flux will flow through these elements when the driving coil 5 is energized with the output of a 3,000 c.p.s. oscillator (not shown) through the conductors 7 and 8. Through induction a feeble current will flow through the windings of the pickup coil 23 which is amplified and rectified by an electronic amplifier to afford a control signal as described. As stated, the magnitude of this control signal is illustrated by a dash-dash line at the mid-section of Figure 4 while the position of the threads of the pickup relative to the flux conducting channels 3 necessary to produce this control or null signal is illustrated by Figure 6. As stated, any rotation of the pickup threads from this position causes them to be moved towards or away from their co-acting channels 3 as illustrated by Figures 5 and 7 with an attendant increase or decrease in the amplitude of the direct current control signal. It will be understood that X—X and Y—Y flux gates are electrically and mechanically identical to one another with the exception that the lengths of the shaft 19 and flux bar 11 of the X—X flux gate are longer than the similar elements of the Y—Y flux gate.

From the foregoing description it will be seen that methods and means are provided by whose use the magnitudes of two direct currents can be controlled from instant to instant to produce two control signals in response to the rotation of rotary magnetic pickups. It will be apparent in Figure 4 that a control point signal is produced when the pickup is in the position shown in Figure 6. A signal of greater amplitude will be produced when the pickup is positioned as shown in Figure 7 and a signal of lesser amplitude will be produced when the pickup is in the position of Figure 5. Thus, the amplitude of the signal produced may be utilized to control a variable in response to displacements of the traces. That is to say, as the displacements of the traces vary and the pickups are rotated, the control signal amplitude varies to control a variable such as the rate and direction of movement of a member. How these signals may control the automatic displacements in a pre-selected path of a cutting tool lying in a system of Cartesian coordinates is fully disclosed in my prior United States Letters Patent No. 2,628,539, Serial No. 571,338, filed January 4, 1945.

A second type of rotatable magnetic scanner capable of continuously sensing any transverse displacement of one or more magnetized traces relative to the direction of movement of a control record upon which the traces are impressed will now be described.

The object of these rotary scanners is to provide a cyclic variation in a magnetic circuit including a magnetized control tape and an induction coil, such that displacement of the parallel line pattern of the magnetized traces appears as a phase shift in the voltage derived from the coil in the magnetic circuit.

At this point it is desirable to point out that the control record used in conjunction with the rotatable magnetic pickups described and illustrated in the remainder of this disclosure differs considerably from the control record 1, Figures 1 to 7, inclusive. This control record had to have considerable thickness since the channels 2 and 3 mechanically cut along the records length had to be of such depth as to hold a considerable amount of flux conducting, ferro-magnetic powder. Also, a thin plastic film had to be cemented along the top surface of the record to seal the channels and thus prevent loss of the magnetic flux conducting powder.

The control records used by the rotary magnetic scanning systems about to be described utilizes orthodox media well known in the art of magnetic recording. Thus, a tape of special stainless steel some .002" thick can be used as the media upon which magnetized traces are impressed, although it will be found that so-called coated recording tapes can be used most satisfactorily. These tapes have a tough plastic backing of cellulose acetate, nylon, vinyl, etc., some .002" to .004" thick, upon which iron oxide is very evenly coated to a thickness of 2 or 3 mils. However, since the magnetic signal storage properties of a recording tape is substantially proportional to the thickness of the oxide coating it will be found that in many industrial controls a thickness or coating of 10 or even more mils will be desirable to afford a very good signal-to-noise ratio.

The impression of magnetized traces on the recording tapes utilized by the variable reluctance rotary scanning devices hereafter disclosed is not described since methods and means for recording displacements on control tapes is fully disclosed in my application for United States Letters Patent, Serial No. 336,768, filed on Feb. 13, 1953. For the purpose of describing the control tapes used with the rotary scanning devices, it is only necessary to know that parallel traces are magnetically impressed along the length of the control tape by means of transverse recording. The displacement of the traces represents the variance in movement of the member controlled. Traces 30, Figure 8, will be considered to be parallel magnetized lines recorded through the thickness of the tape 31, while their polarity will be considered to be north. The intervening traces 41 (shown white in Figure 8) will be considered to have south polarity. It will be further assumed that the spacing or pitch of the magnetized north traces to be exactly .050" when measured transverse to the tape 31, while its length may be considered to be many hundreds of inches. The arrow adjacent to the tape 31, Figure 8, indicates that the tape is continuously fed during the system's operation in a downward direction when viewed as in Fig. 8.

Figures 8, 9:
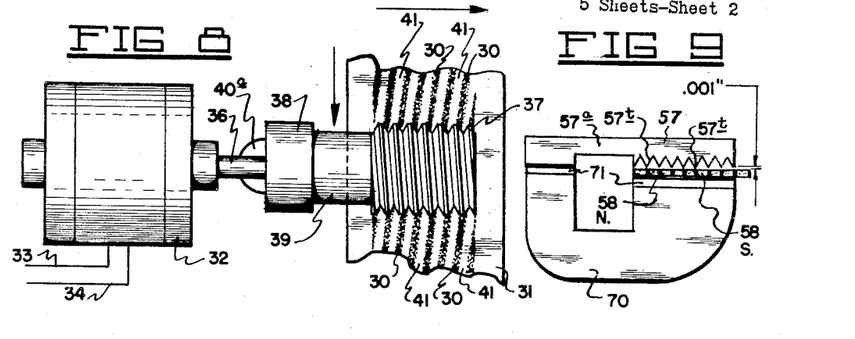
Figure 8 is a plan view of a second species of magnetic scanner adapted to be continuously rotated.
Figure 9 illustrates certain portions of a scanner serving as a complete magnetic circuit used in the rotary scanner shown in Figures 12 and 13.
Figures 10, 11, 12, 13, 14:
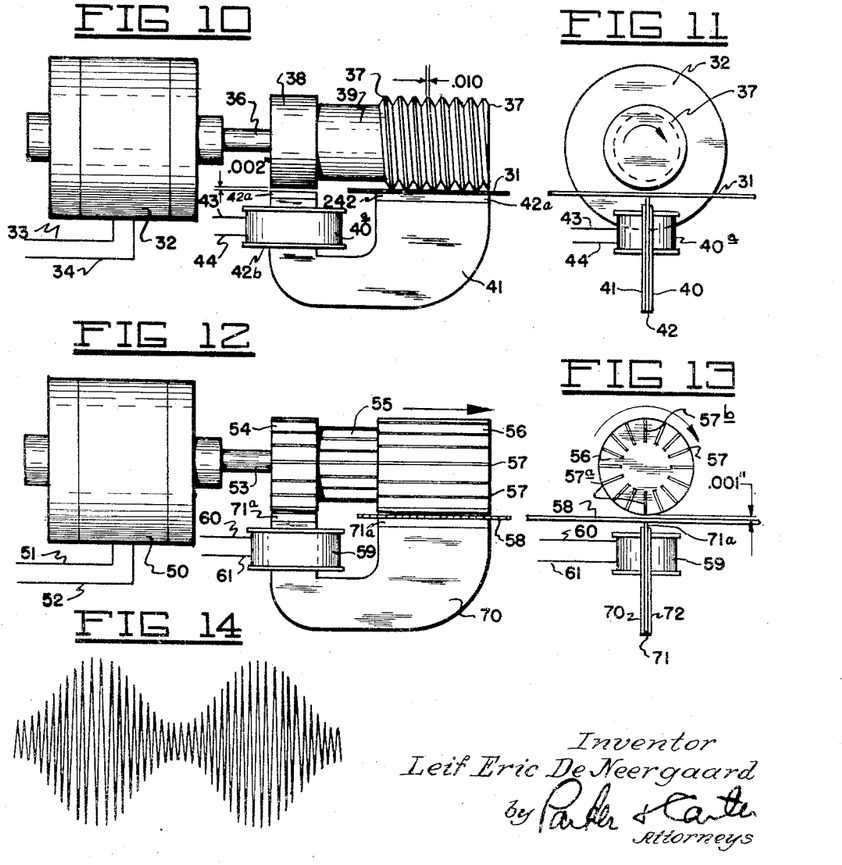
Figure 10 illustrates in elevation the rotary pickup shown in Figure 8.
Figure 11 is an end view of certain elements shown in Figure 10.
Figure 12 is an elevation of another species of magnetic scanner adapted to be continuously rotated.
Figure 13 is an end elevation of certain elements used in the device illustrated by Figure 12.
Figure 14 graphically illustrates the signal output of the rotary scanners shown in Figures 9, 12, 13, and 15 through 28.

A two-pole, single phase, synchronous motor 32 is supplied with 60 cycle alternating current (as an example) from a convenient source through the two conductors 33 and 34. A rotary scanner comprised of scanning threads 37, end land 38, and neck 39 preferably made of Permalloy, Mumetal, or other magnetically permeable material is mounted integral and concentric to the rotor shaft 36 of the motor 32. This shaft is made of non-magnetic stainless steel, bronze, or similar non-magnetic material to magnetically isolate the rotary scanner from the motor field. A single helical thread 37 whose pitch is identical to the pitch of the magnetized traces 30 or exactly .050" is generated along a section of the length of the scanner. The crest of the thread 37 may be some .010" wide as shown in Figure 10. Otherwise it may be considered to have the 60° angle configuration commonly found in orthodox machine screws. The end land 38 of the scanner nearest the motor is substantially the same diameter as the outside diameter of the scanning threads 37. However, the diameter of the neck 39, as shown, is preferably the same as the root diameter of the scanning threads 37. A clearance is therefore maintained between the neck and the control record tape 31.

Figure 10 illustrates in elevation the same elements shown in plan in Figure 8. From Figures 10 and 11 it will be seen that three laminations 40, 41, and 42 serve as flux conductors since they are in magnetic circuit with the rotary scanner and the control recording tape 31. Laminations 40 and 41 are identical in size. Lamination 42 is also substantially the same shape with the exception that two vertical legs are slightly longer than the corresponding legs of laminations 40 and 41. Therefore, the laminated structure is three laminations thick except at its pole ends where it is reduced to the thickness of the center lamination 42. The laminations are preferably made of hydrogen annealed Mumetal or similar material and should be some .010 to .020 inches in thickness. The width of the right-hand end of the laminations (as viewed in Figures 9 and 10) should be exactly equal to the width of that portion of the tape 31 occupied by the traces 30 and 41. Thus, if seven traces 41 are impressed on the control recording tape 31 and the pitch of the traces is .050", the widths of the laminations 40, 41, and 42 would be exactly .700". The recording tape 31 is drawn across the edge of laminations 42 as shown by Figures 10 and 11. It is very important that a minimum of .002" or even less clearance be maintained between the edge 42ᵃ of lamination 42 and the end land 38 in order to reduce the reluctance of the magnetic circuit through air as much as possible at this point. A coil 40ᵃ of many turns of No. 39 or 41 magnet wire (as an example) is wound on a plastic form 42ᵇ. As illustrated by Figures 10 and 11, the coil is positioned around one leg of the laminated structure. Two conductors 43 and 44 lead the output of the coil 40 to an amplifier (not shown).

The operation of the rotatable magnetic scanner whose elements have just been described will not be described. Alternating current of commercial frequency (60 cycle as an example) is led to the field windings of the motor 32 by the conductors 33 and 34. The motor being synchronous and two-pole will rotate the rotary scanner at a constant speed of 3600 r.p.m. or 60 r.p.s. if supplied with sixty cycle alternating current, in the assumed clockwise direction as illustrated in Figures 8 and 10, they (with proper polarity connections to the motor) will continuously scan the alternate north and south traces 30 and 41 respectively at the rate of one pitch per revolution or at the rate of sixty pitches per second. It should be understood that the air gap or clearance between the iron oxide coated face of the control recording tape and the immediately adjacent threads 37 should also be held to an absolute minimum. Under no circumstances should the rapidly moving threads scanning the traces magnetically impressed on the iron oxide coating come into contact with this soft coating. On the other hand, an excessive clearance between the peaks of the scanning threads and the iron oxide face of the control tape will result in a large air gap having a very high reluctance.

Since each thread passes from the exact center of a north magnetized trace across a south magnetized trace to the exact center of the next north magnetized trace per revolution of the rotary scanner, it will be seen that the direction taken by the magnetic lines of force threading the magnetic circuit (comprised of the rotary scanner, the control recording tape and the laminated structure) will go through one complete reversal per revolution of the rotary scanner. The flux threading the magnetic circuit will alternately flow in one direction and then in the opposite direction as a thread is rotated through 180° to move it from the exact center of a north trace to the exact center of a south trace.

Any changes in the magnitude and direction taken by magnetic flux threading the magnetic circuit produces a corresponding voltage change in the windings of the coil 40ᵃ wound around one leg of the laminated structure. Thus, the coil inductively generates an alternating voltage whose frequency will be (with the control tape stationary) exactly 60 c.p.s. or the precise rate of rotation of the rotary scanner. However, assume for purposes of description that the tape is fed downward (as viewed in Figure 8) at a rate of 2.00" per second and that the magnetized traces 30 and 41 are displaced in the direction shown at a slope of one pitch or .050" per 1.000" length of tape. Since the tape is fed at 2.00" per second, it is apparent that the traces, if visible, would appear to be displaced from left to right as shown by the arrow on the upper margin of the illustration of the tape 31, Figure 8. The rate of displacement of the traces would thus be two per second in a direction from left to right. However, since the threads 37 integral to the rotating scanner are being continuously displaced from right to left as illustrated by the arrow on the rotary scanner across the width of the tape at the rate of sixty pitches per second, it will be seen that each pickup thread will actually scan 60 plus 2 or 62 traces per second to produce a 62 c.p.s. signal in the pickup coil 40ᵃ.

Conversely, with the traces sloping by the same amount but in the opposite direction to that shown in Figure 8, the traces would appear to be displaced (if visible) in a direction from right to left and at a rate of two pitches or two traces per second. Under these conditions, the threads of the rotary scanner would scan or "read" 60−2 or 58 lines per second to cause the coil to generate an alternating E.M.F. of exactly 58 c.p.s.

If, however, the tape feed is stopped, the frequency of the signal output of the coil 40 will instantly go to 60 c.p.s. or the exact rate of the rotary scanner's rotation is R.P.S. It is obvious that if the parallel magnetized traces slope from left to right (in the direction of the arrow, Figure 8) by one pitch or .050" in 20" measured along the axis of the tape and if the tape is fed continuously downward past the rotary scanner at the rate of 2" per second that the frequency of the signal output of the coil would be 60.1 c.p.s. This is evident since one trace would move from left to right past the threads in ten seconds due to the movement of the tape. However, since the threads are continuously scanning the traces at the rate of sixty pitches per second the threads, in ten seconds, would scan 10×60 or 600 traces plus the one trace moved past the scanner or a total of 600+1 or 601. Thus, the frequency in c.p.s. would be 601 divided by 10 or 60.1 c.p.s.

From the foregoing it will be apparent that any displacement of the parallel traces results in a proportional phase variation in the signal produced by the coil.

Since the pitch (used thus far for purposes of illustration) is exactly .050" it will be seen that the displacement of the magnetized traces 30 and 41 in one direction measured transverse to the tape axis by one pitch will cause a phase displacement of a certain sign (plus, for example) of +360 electrical degrees, a +.010" displacement of the traces in the same direction will produce a phase displacement of +72 electrical degrees while, lastly, a displacement of the traces of but .0005" in the same direction will produce a phase displacement of +3.6 electrical degrees. Conversely, opposite displacement of the traces by the above amounts will produce phase displacements of −360E°, −72E°, and −3.6E°, respectively.

As stated, one of the most valuable features of the family of rotatable scanners herein disclosed is their ability to continue to produce a control signal with the control tape or other recorded media absolutely stationary. This is of very great value in industrial servo-systems or automatic controls since it is of the utmost importance, for many different reasons, to furnish a magnetic data storage system which is capable of generating a datum signal with the record element in a static condition.

Since the displacement of tools controlled by servo-systems utilizing the rotary scanning devices described in the instant disclosure are continuously regulated by the magnitude and direction of displacement imparted to magnetized traces measured at right angles to the control recording tape axis, it will be seen that no displacement of the traces transverse to the direction of feed of the control tape is possible if the tape is stationary. However, the control signal is not lost since the coil continues to generate a signal whose frequency in cycles per second is precisely equivalent to the angular rate of rotation of the rotary scanner expressed in revolutions per second or the base frequency of sixty cycles per second.

While the rotary pickup or scanner shown in Figures 1 through 7 is disclosed as being intermittently actuated, it will be apparent that the rotary pickup or scanner may be continuously rotated by a synchronous motor in the manner shown in the embodiment of Figure 8. In such a case the driving coils 5 and 6 shown in Figure 1 would be excited with a high frequency alternating current to produce a high frequency alternating flux which in turn would be modulated at a frequency proportional to the angular velocity of the rotary pickups, it being understood that this modulating frequency would be regulated by the displacement of the traces.

Figure 12 is an elevation showing a modification of the rotary magnetic scanner illustrated by Figures 8, 10 and 11. It will be assumed the control tape 58 (Figures 12 and 13) to be identical to tape 31 (Figure 8). A rotary scanner comprised of end land 54, neck 55, and main body 56 is machined from a solid bar of bronze or similar non-magnetic material. Sixteen (as an example) laminations 57 of very thin (.015" thick as an example) Mumetal or similar metal having high permeability at low flux densities are provided in the rotary scanner. Figures 9 and 12 illustrate that these laminations extend through the length of the bronze body of the magnetic scanner while Figure 13 illustrates that the laminations are radially disposed in equidistantly spaced slots provided for them in the scanner body. Figure 9 is an illustration of one of the sixteen laminations, all of which are identical with the exception of the placement of the teeth 57$^t$. It will be understood that the pitch between these teeth is exactly .050" or identical to the pitch of the threads 37, Figures 8 and 10. It will be further understood that record tape 58 may be, for purposes of illustration, identical to the short length of control tape 31 illustrated in Figure 8.

Each lamination 57 is magnetically isolated from adjacent similar elements since the bronze body supporting them is equivalent to a high reluctance path through air. The teeth 57$^t$ in each lamination 57 are so cut that when all of the laminations are assembled integral to the bronze body constituting the rotary scanner, a right-hand helix of .050" pitch will pass through the exact centers of each tooth. It is obvious that sixteen lamination blanks (without teeth) could be inserted integrally in the slots provided for them in the bronze body of the rotary scanner after which a .050" pitch thread would be generated along the length of the main body 56 to produce a configuration identical to the threads 37, Figures 8 and 10. It is, however, highly advisable to first generate the teeth 57$^t$ in the laminations 57, carefully hydrogen anneal them and finally permanently fasten them in the bronze body of the rotary scanner with plastic cement. This is important since desired magnetic properties of materials having high permeability at very low flux densities are greatly reduced if any work is performed on them after annealing. The sections of the sixteen slots cut through the main body 56, Figure 12, and occupied by the teeth 57$^t$ are filled with plastic to afford a very smooth cylindrical surface.

Three stationary laminations 70, 71, and 72 preferably made of material identical to that used in the rotated laminations 57 and identical in outline and construction to similar laminations 40, 41, and 42, Figures 10 and 11, are provided as a return path in the magnetic circuit of the device. It will be noted from Figures 12 and 13 that the ends 71$^a$ of the center lamination 71 extend slightly beyond the ends of laminations 70 and 72 which serve as supports to the center element. A pickup coil 59 identical to coil 40$^a$, Figures 8, 10, and 11, is located about the left-hand leg of the stationary lamination assembly as viewed in Figure 12. The stationary lamination assembly with coacting pickup coil 59 is rigidly supported in such a manner that a fixed air gap of .002" or less is maintained between the left-hand end of lamination 71 and the outside diameter of end land 54 as in the pickup illustrated in Figure 10. An air gap must also be maintained between the right-hand end of lamination 71 and the cylindrical surface of main body 56 which is just sufficient to allow the record tape 58 to be drawn between the gap without the surfaces of the recording tape coming into physical contact with the rapidly revolving surfaces of the rotary scanner. A clearance of .001" is illustrated in Figure 13.

The rotary scanner is mounted concentrically and integral to the rotor shaft 53 of a two-pole synchronous motor 50 which is supplied during the operation of the rotary magnetic scanner with 60 cycle alternating current through the leads 51 and 52.

The operation of the rotary magnetic pickup or scanner will now be described. The synchronous motor (with proper polarity connections) causes the rotary scanner to be continuously revolved 60 r.p.s. in a clockwise direction as shown in Figure 13. Since the peaks of the teeth 57$^t$ cut in each rotated lamination 57 are arranged in a right-hand helix of .050" pitch, it will be seen that the magnetized traces impressed on the recording tape 58 (and as stated for purposes of illustration, identical to recording tape 31, Figure 8) will be scanned from left to right (as indicated by the arrow, Figure 12) in much the same manner that recording tape 31 was scanned by threads 37 of the rotary scanner illustrated in Figure 8.

However, the flux threading the magnetic circuit of the rotary pickup, illustrated in Figures 12 and 13, will be chopped sixteen times per revolution of the rotary pickup for, it will be understood that magnetic flux recorded on the tape 58 can only flow through the induction coil 59 at those instants that one of the rotated laminations 57 is in very close proximity to the magnetized traces and simultaneously in substantially perfect register with the center stationary lamination. The instant that the rotated lamination is revolved a very few degrees from this position, the flux picked up by the teeth from the magnetic traces impressed on the recording tape and threading the rest of the rotated laminations and stationary lamination 71, instantly diminishes to zero magnitude. Therefore, no magnetic flux will flow through the induction coil 59 and the magnetic circuit until the next rotated lamination 57 is brought into register with the fixed lamination 70, and so on.

In this manner, a high frequency signal of 16×60 or 960 c.p.s. modulated at 60 c.p.s. is generated. It will be apparent that displacement of the traces will produce a variance in the 60 c.p.s. signal in the same manner that a variance is obtained in the embodiment of Figure 8. If, however, twenty-four rotated laminations 57 were provided in the rotary scanner instead of sixteen, as described, the flux threading the magnetic circuit would be interrupted twenty-four times per revolution or 24×60 or 1440 times a second. This would produce a high frequency alternating voltage within the windings of coil 59 of 1440 c.p.s. modulated at 60 c.p.s. Such a signal is graphically represented by Figure 14.

The form of pickup shown in Figures 9, 12, and 13 is employed to pick up and transmit data in the form of transverse displacements of channels in a record in the same general manner as the form of the invention shown in Figures 8, 10 and 11. A cyclic variation proportional to the displacement of the channels is produced.

Still another type of rotary magnetic pickup will now be described. This device illustrated by Figures 15 to 19 is similar to the other two synchronously rotated magnetic pickups just described in that it is capable of instantly converting any displacement of magnetized traces in directions measured transverse to the axis of a recording tape upon which the traces are impressed into an electrical phase displacement whose magnitude and sign (+ or —) expressed in electrical degrees is a precise index of the magnitude and direction of transverse displacement imparted to the traces. However, the rotary scanner about to be described and illustrated by Figures 15 to 19 differs from the former pickups in two respects. First, the rotated flux pickup elements are arranged in an Archimedes spiral on the plane surface of a revolving disc instead of a helix wrapped around a cylinder and secondly the pickup is capable of simultaneously scanning two separate channels of totally unrelated displacement intelligence recorded along the length of a single recording tape.

Figure 18:
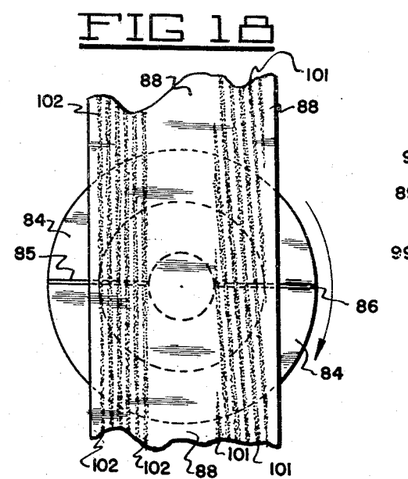
Figure 18 is a plan view of a section of a recording tape operating in conjunction with the rotatable pickup shown in Figure 17.

Figure 18 illustrates such a recording tape 88 having dual channels impressed along its length. The left-hand channel (as viewed in this figure) is occupied by a series of similar magnetized north traces 102 separated by south traces indicated in white on this figure. The traces are in exact parallelism as shown. A right-hand channel similarly occupied by parallel alternate north and south traces is located in a manner to be described. These two separate channels can be used to separately control two completely divorced control functions in a process-control or servo-mechanism.

Figure 15:
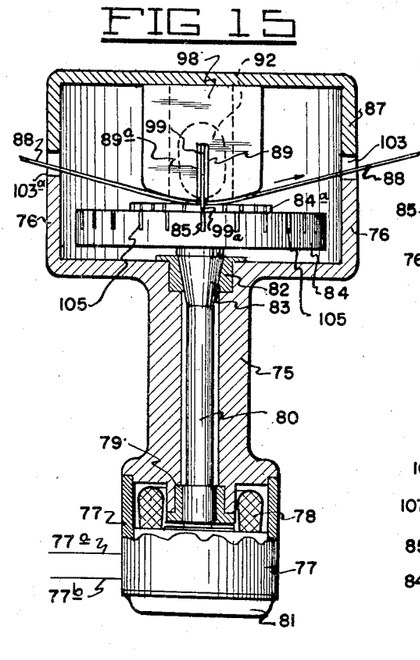
Figure 15 illustrates in a cross-sectional elevation another type of magnetic scanner adapted to be rotated continuously.

A stator housing 77, Figure 15, whose lower end is closed by an end-cap 81, is mounted integral to a housing sleeve 75. The stator housing 77 encloses a field-winding 78 of a two-pole, synchronous motor supplied during the operation of the device with 60-cycle alternating current through necessary leads 77ᵃ and 77ᵇ. A scanner housing 76 integral with housing sleeve 75 supports a top cover 87 at its upper end. Both the main housing and top cover should be made of such non-magnetic material as bronze to minimize the conduction of stray magnetic flux into the interior of the upper part of the assembly in which the flux pickup elements are mounted.

A scanner disk 84 integral to a shaft 80 is preferably machined from a solid bar of bronze or similar non-magnetic material. This element must be highly stable and accurately made to reduce warpage of the disk or misalignment between it and its supporting shaft. A tapered land 83 is ground near the upper end of shaft 80 and is supported at this point by a thrust bearing 82. The lower end of shaft 80 is radially supported by a radial bearing 79. Both bearings are preferably made of close-grain gray cast iron or stainless steel. The rotor (not shown) of the two-pole, synchronous motor is mounted on the lower end of the shaft 80. Since the weight of the scanner disk, shaft, and motor rotor is borne by the thrust bearing 79 and due to this assembly's axis being vertical, it will be seen that the scanner disk is capable of being revolved at high rotative speeds with substantially no vibration.

Two recesses are cut in the top cover 87 to provide opposite slots 103 and 103ᵃ, Figure 15, through which recording tape is drawn in a direction from left to right as indicated by the arrow. A saddle 98 is rigidly supported by the top cover 87. The saddle is preferably made from porcelain although certain highly table plastics may be used. A narrow slot just wide enough to accommodate three laminations 89, 99 and 89ᵃ is cut through the length of the saddle 98. This saddle serves to rigidly and accurately support two similar coil systems each comprised of an induction pickup coil and three associated laminations preferably made of .015″ thick Mumetal.

Figure 16:
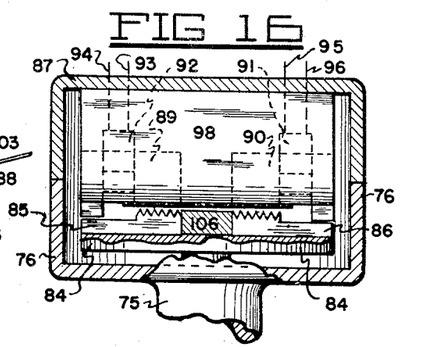
Figure 16 is a second cross-sectional elevation taken through another plane through the scanner shown in Figure 15.
Figure 19:
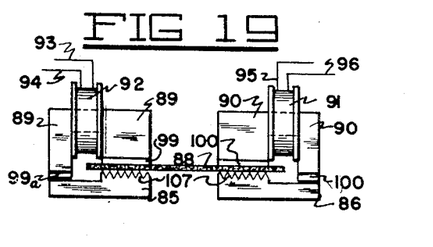
Figure 19 is an elevation of two separate magnetic circuits used in the scanning device illustrated by Figures 15 and 16.

The coil systems are shown in dotted outline in Figure 16 and are separately shown in Figure 19. A coil 92, Figure 19, consisting of many turns of very fine insulated magnetic wire are wound on a nylon or other plastic spool which is arranged around the three laminations 89, 99, and 89ᵃ. Figure 15 illustrates the ends of these laminations. A study of this figure and also Figure 19 indicates that the ends 99ᵃ of laminations 99 extend slightly below the ends of laminations 89 and 89ᵃ. These laminations along with all other laminations used in the device being described should preferably be made of thin (.010″–.020″ thick, as an example) Mumetal or other material having high permeability at low flux densities. Furthermore, all laminations should be carefully hydrogen annealed after all machine work on them is completed. This is important since the magnitude of the magnetic flux picked up from the traces on the recording tape is of a very low order. It should be understood that the tape's plastic backing (if iron oxide, plastic-backed recording tape is used) is suitably supported to slide over the highly finished, rounded surfaces provided on the lower end of the saddle 98. The output of pickup coil 92, as illustrated in Figure 16, is led out of the top cover 87 through two shielded conductors 93 and 94.

A second coil system comprised of the induction coil 91 and laminations 90, 100, and 90ᵃ (the last not shown) is illustrated at the right hand of Figure 19. This system is identical in all respects to the similar assembly located at the left-hand end of this figure and just described.

Figure 17:
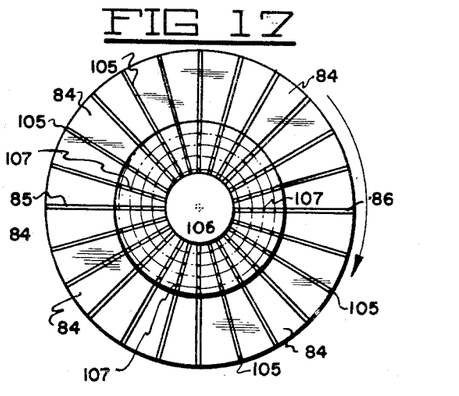
Figure 17 is an elevation of a rotatable pickup used in the device illustrated by Figures 15 and 16.

Study of Figure 17, which is a plan view of the scanner disk 84, shows that 24 laminations 105 are radially arranged in a similar number of exactly equidistantly spaced slots provided in the body of the disk 84. For purposes of illustration, the lamination shown in a horizontal position at the left-hand of Figure 17 has been numbered 85 while the lamination located 180° from lamination 85 is numbered 86. These laminations 85 and 86 are also shown in Figures 16, 18, and 19. An end view of lamination 85 appears again in Figure 15. The general outlines of these laminations supported by the rotatable scanner disk 84 are identical.

Their outline is shown in Figure 19 which also illustrates that teeth 107 are generated along the upper edges of these laminations. Figure 17, which shows the laminations in plan, clearly illustrates that the peaks of the teeth 107 are arranged in the form of an Archimedes spiral whose pitch may, for purposes of description, be taken to be exactly .050″. The pitch of the "north" magnetized traces 102 and 101 will also be understood to be precisely .050″.

The inner leg of the lamination stack comprised of elements 89, 99, and 89ᵃ, immediately adjacent to the tape 88, are rigidly supported by the saddle 98 in such a manner that the edge of lamination 99 is flush with the surface of the saddle 98 affording slidable support to the recording tape. Figure 19 illustrates that lamination 99 is supported by the saddle (not shown in this figure) so that a very small air gap is continuously maintained between the end 99ᵃ of the outside leg of this lamination and the 24 rotated laminations mounted in the scanner disk. A stack of three laminations having a center lamination 90 and a pair of outside laminations (not shown) similar to laminations 89, 89ᵃ, and 99 illustrated at the right-hand side of Figure 19 are similarly supported. The length of the air gaps between the rotated and stationary laminations should be held to an absolute minimum value or the efficiency of the magnetic circuit which they comprise will be greatly reduced.

The operation of the Archimedes spiral, rotary magnetic pickup will now be described. The two-pole synchronous motor is supplied with 60-cycle alternating current through the two conductors 77ª and 77ᵇ to rotate the scanner in a clockwise direction when viewed in plan as shown in Figures 17 and 18. The teeth 107, Figure 19, generated in each rotated lamination appear to an observer to continuously move inwardly at the rate of one pitch per revolution or 60 pitches per second due to the peaks of the pointed teeth 107 being arranged in an Archimedes spiral as shown in Figure 17. The traces 102 in the left-hand channel of Figure 18 will therefore be continuously scanned by the teeth in the rotated laminations in a direction from left to right while the traces 101 in the right-hand channel provided near the right-hand edge of tape 88 will be continuously scanned in the opposite direction or from right to left.

At certain instants of the scanning disks rotation one of the laminations 85, Figure 17, will be in register with stationary lamination 99, Figure 19, while simultaneously stationary lamination 90 will be in exact register with another rotated lamination 86 located exactly 180° about the scanner disk from the first lamination. This condition is illustrated in Figures 15 to 19. The rotated lamination in instantaneous register with stationary lamination 99 is numbered 85 while the opposite rotated lamination in coincidence with stationary lamination 100 is indicated 86 in the drawings.

The pitch of the Archimedes spiral and the pitch of the magnetized traces 101 and 102 are, as stated, identical. Therefore, the teeth 107, Figures 17 and 19, will scan the traces 102, Figure 18, from left to right at the rate of one pitch per revolution or 60 times per second. Similarly, the traces 101 will be scanned at the same rate in the opposite direction. However, flux will only flow through the stationary and rotated laminations only at those instants that they are in substantial register. When a rotated lamination is moved one or two degrees from the position of perfect registry with one of the stationary laminations, the magnitude of the flux threading the magnetic circuit (comprised of the magnetized trace on the recording tape, the stationary laminations and the rotated lamination) instantly falls to substantially zero. Since each rotated lamination is magnetically isolated, no flux will flow through the stationary laminations until a rotated lamination is again in register with them. Since the scanning disk 84 is provided with 24 equally spaced, magnetically isolated, Mumetal laminations or inserts, the magnetic flux picked up from the magnetized traces will be interrupted 24 times per revolution or 1440 times per second (24×60 r.p.s.). Each of the induction coils will therefore have a 1440 c.p.s. high frequency output which, as illustrated by Figure 14, is modulated at 60 c.p.s. at such instants that the traces magnetically impressed on the recording tape are parallel to the edges of the tape, or at such instants that the tape is stationary. This 60 c.p.s. modulation is, of course, due to the teeth 107 being arranged in a multiple convolution Archimedes spiral of .050" pitch. If the scanner disk 84 was made of a solid piece of Mumetal with a continuous multiple convolution .050" pitch Archimedes spiral generated on its face (in lieu of the isolated Mumetal lamination construction herein described) it will be seen that the magnetized traces immediately adjacent the stationary laminations would be continuously scanned in directions parallel to these laminations once per revolution or 60 times per second (using a two-pole, 60-cycle, synchronous motor) to produce a 60-cycle signal in the coils. However, with this later type of construction there would be great danger of the left-hand stationary lamination assembly picking up totally unwanted flux through the solid Mumetal scanner disk from the right-hand channel (Figure 18) or vice versa. It will be understood that any pickup of stray flux by an induction coil from the wrong magnetized traces will cause a very serious error to be evident in the coils' output signal since all of the outputs of the various types of synchronous rotary scanners described and illustrated in this disclosure are alternating electromotive forces which are highly susceptible to stray fields even of very low magnitude. It is for this reason that the isolated laminations of Mumetal are provided in the scanning disk of magnetic non-conducting bronze. Therefore, due to their complete magnetic isolation from one another, it is entirely practical to use these laminations to alternately scan magnetized traces lying in one channel of a recording tape (see Figure 18) and magnetized traces lying in another channel during each revolution of the scanning disk. The possibility of simultaneously scanning the traces lying within two separate channels extending along the length of a recording tape is of very great importance in certain automatic process controls and in certain types of servo-mechanisms controlling the displacement of slidable members of machine tools. Each group of traces 101 and 102 may be used to control one direction of movement of a machine tool, for example.

From Figure 18, it will be seen that the magnetic traces 102 in the left-hand channel are exactly parallel to the left-hand edge of the recording tape 88. If desired, by recording these traces along the entire length of the tape parallel to its left-hand edge, it is possible to continuously generate a reference signal which can be used to instantly and continuously compensate for any unwanted movement of the recording tape in directions transverse to its axis. The use of magnetized traces parallel to one edge of a control tape along its operating length can be used to eliminate means for edge-guiding the tape.

Figures 20, 21, 22, 23, 24:
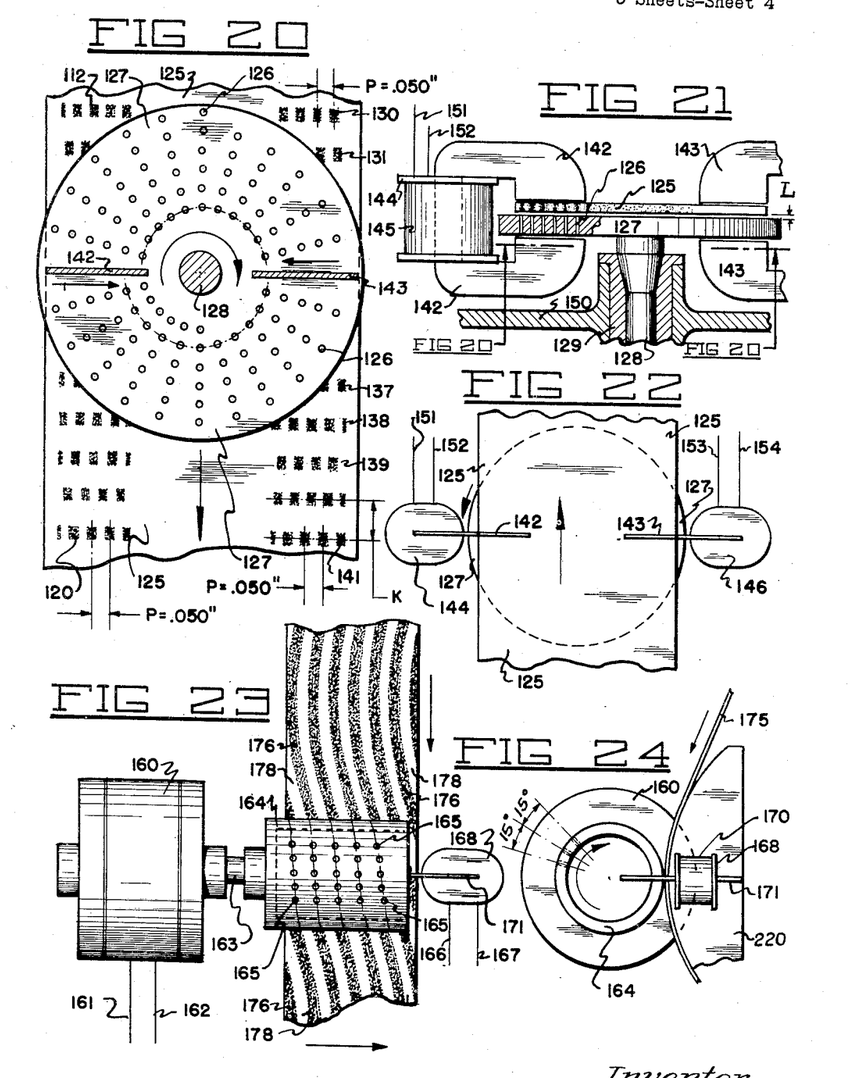
Figure 20 illustrates another species of magnetic scanner adapted to be rotated at preferably a constant speed.
Figure 21 illustrates in partial cross-section certain elements used in the magnetic scanner illustrated by Figure 20.
Figure 22 illustrates in plan two induction coils and a short length of recorded tape associated with the pickup devices illustrated by Figures 20 and 21.
Figure 23 illustrates in plan another type of rotary magnetic scanner in which pickup elements consisting of flux conducting pins magnetically isolated from one another are arranged in a helix.
Figure 24 is an elevation of some of the elements used in the device illustrated by Figure 23.

Figures 20, 21, and 22 illustrate another type of magnetic scanner adapted to be rotated at a constant speed during its operation. Figure 20 is a section taken through Figure 21 as indicated by the arrows in this latter figure. A circular scanning disk 127 is mounted integral to a shaft 128, Figure 21. The diameter of the disk, as shown in Figures 20, 21, and 22, is slightly greater than the width of the recording tape 125 which it continuously scans during the operation of the magnetic pickup. It will be noted from study of Figure 20 that certain small rectangular areas on the recording tape 125 are magnetized at north polarity. Such areas are depicted in this figure by speckled cross-hatching. The pitch P (see Figure 20) will be understood to be exactly .050" and, as shown, is the distance from the center of one magnetized area to the center of an adjacent area measured transverse to the recording tape length. The pitch is therefore identical to the .050" spacing of the magnetized traces impressed on tape 31, Figure 8, and tape 88, Figure 18. One horizontal grouping (as viewed in this figure) is separated from the next grouping by a pitch of K which may be taken for purposes of illustration to be .125".

The scanning disk 127 is mounted integral with a bronze shaft 128, Figure 21, which is supported at its upper end by a thrust bearing 129 preferably made of fine-grain cast iron or non-magnetic steel. The bearing is press fitted into a housing 150 made preferably of bronze and only partly shown in Figure 21. Although not illustrated, it will be understood that housing 150 is generally similar to housing 76, Figure 15, whose integral housing-sleeve 75 supports a two-pole, synchronous motor at its lower end. It will therefore be understood that shaft 128, Figure 21, is rotated by means of a two-pole, synchronous motor at the rate of 60 r.p.s. during the operation of the rotary magnetic pickup. From Figure 21 it will be seen that a clearance L is maintained between the upper horizontal plane surface of the scanning disk 127 and the lower surface of the tape 125 which is shown in cross-section indicated by speckled cross hatching. It will be understood that the axis of the recording tape is normal to the plane upon which Figure 21 is drawn and that it is displaced in a direction away from the viewer or as indicated by the arrow in Figure 22 which is a plan view of the tape 125 and scanning plate 127.

The scanning disk 127, circular in form and exactly .100" thick (as an example) is made of glass, porcelain, or plastic having an extremely high mechanical stability. The purpose of this disk is to rigidly support a group of pins 126 which are preferably made of hydrogen annealed Mumetal (or other material having high permeability at low flux-densities). The pins are shown as circular in form and extend through the disk 127 with their ends exactly flush with the upper and lower plane surfaces of the scanning disk 127. Figure 20 illustrates that the pins are equidistantly spaced on 24 radially disposed lines. The angular spacing of these lines is exactly 15°. It will be noted from the figure that the pins 126 are arranged in the pattern of an Archimedes spiral having multiple convolutions. The pitch of this spiral will be taken to be exactly .050", while the diameter of the pins will be understood to be .0125" or one quarter of the pitch. Although not shown, it will be understood that the recording tape 125 is slidably supported by a member similar to saddle 98, Figures 15 and 16. This member (not shown) also rigidly supports two separate coil assemblies illustrated in plan by Figure 22.

The left-hand coil system, as viewed in Figures 21 and 22, is comprised of lamination 142 and induction coil 145. The lamination is preferably made of .0120" thick, hydrogen annealed Mumetal. The induction coil consists of thousands of turns of No. 41 (as an example) insulated magnet wire wrapped on a plastic spool 144 through which lamination 142 extends. Figure 21 illustrates that the lamination is "C-shaped" with its ends terminating in two horizontal edges. The upper horizontal edge bears against the plastic backing of the recording tape 125, while the lower horizontal edge is so positioned that a very small clearance (.0005" for example) is always maintained between it and the lower plane surface of the scanning disk 127. An extremely small air gap is also maintained between the upper plane surface of this disk and the lower surface of the recording tape. In Figure 21 the thickness of the tape has been greatly exaggerated for purposes of illustration since it is actually some .003" to .010" in thickness.

The operation of the scanner illustrated by Figures 20, 21, and 22 will now be described. The disk 127 is rotated at 60 r.p.s. by a two-pole, synchronous motor whose rotor is integral to the lower end of shaft 128, Figure 21. The direction of rotation is indicated in Figure 22 which is taken in plan and Figure 21 which is taken in reverse plan. The scanning pins 126, due to their positioning along a spiral, continuously move inwardly towards the axis of rotation of scanner disk 127, as shown in Figure 20. The magnetized traces lying in the left-hand channel of recording tape 125 and in exact register with lamination 142 are scanned at the rate of one pitch per revolution or 60 times per second in a direction from left to right by the pins as shown by the arrow. The magnetized traces lying in the right-hand channel of tape 125 are oppositely scanned by the pins at the same rate. The scanning pins, as stated, lie in an Archimedes spiral configuration whose pitch is .050". Since there are 24 radially disposed groups of scanning pins the traces will be scanned discontinuously at the rate of 24 times per revolution or 60×24 per second to produce an e.m.f. in the winding of the pickup coil modulated at 1440 c.p.s. Each consecutive set of radially disposed scanning pins, when brought into exact register with lamination 142, will be advanced in increments of $$\frac{.050''}{24}$$

or .0028" from left to right along the length of lamination 142. Since the magnetic flux stored in the magnetized traces impressed on the recording tape is of extremely low magnitude, it will be understood that flux will thread the magnetic circuit comprised of said tape, lamination 142 and the pins 126 only at such instants that said pins are simultaneously in substantial exact register with the traces and the lamination. At all other instants of non-registry no flux will flow since the air gap between the scanning pins and the lamination 142 and thus the reluctance of the magnetic circuit will be too great. Due to the flux being chopped 24 times per revolution and the discontinuous scanning of the magnetized traces at the rate of one pitch per revolution, it will be seen that the output of the pickup coil 145 will be a signal having a high frequency component of 1440 c.p.s. modulated at 60 c.p.s. Such a signal is illustrated by Figure 14. It is of course obvious that the same scanning pins 126 are used to constantly scan the traces in both left and right hand channels of recording tape 125 in reverse direction but in an identical manner. This is made possible by the pins being completely isolated from one another. Thus no spurious or unwanted flux can be picked up by coil 145 from the magnetized traces in the right-hand channel of control tape 125 or vice versa.

Since the various types of continuously rotated magnetic pickups herein disclosed are normally used in industrial plants where strong alternating magnetic fields from electrical equipment such as motors, transformers, and the like are almost always present, it will be understood that the mass of Mumetal or other material having high permeability at low flux densities should be kept to an absolute minimum. This is particularly important in the construction of the rotary scanning elements themselves for the Mumetal provided in these various types of pickups not only pick up wanted signals from the magnetized control tapes but also, unfortunately, cut any stray magnetic fields present in close proximity to the various pickups' magnetic circuits. This unwanted flux is obviously cut by the mass of Mumetal in the rotary elements of the pickups at the high angular velocity of 60 c.p.s. Since the intelligence magnetically impressed on the recording tapes is converted into an alternating current signal whose phase from instant to instant is the exact index of the traces' displacement (measured transverse to the axis of the recording tape), it will be seen that it is most essential to reduce the cutting of stray magnetic fields by the mass of rotating Mumetal as much as possible especially if the frequency of the stray flux is 60 c.p.s. This is apparent since the cutting of any stray flux modulated at 60 c.p.s. by the Mumetal in the rotary pickups will be added or subtracted to the output of the induction coils to produce at times a serious phase displacement to the desired alternating E.M.C. signal output of the pickup coils.

Figures 25, 26, 27:
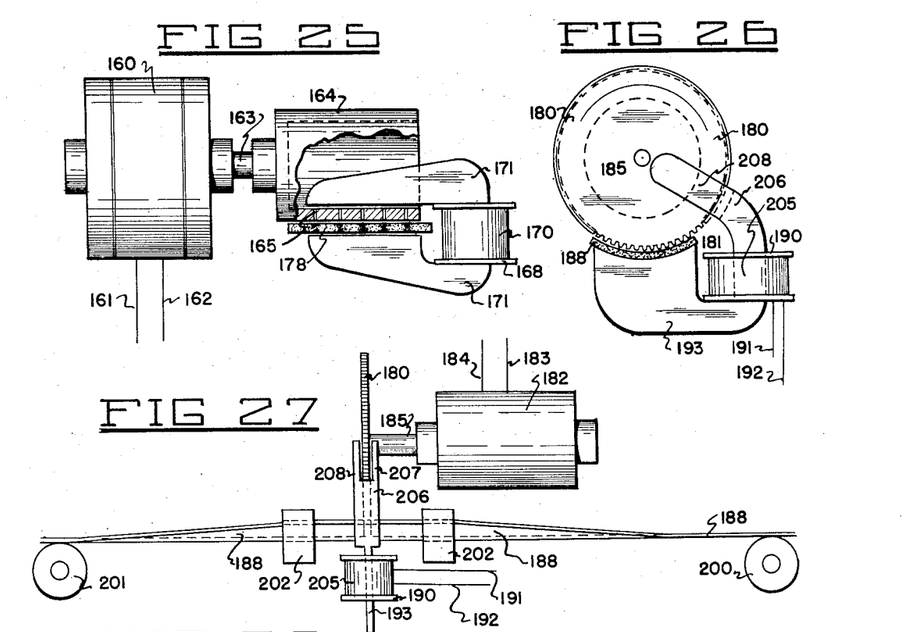
Figure 25 is an elevation of the magnetic scanner illustrated in plan by Figure 23 and shows some of the essential elements in partial cross-section.
Figure 26 illustrates still another form of magnetic scanner adapted to be continuously rotated to produce a signal having cyclic variations.
Figure 27 is an elevation of the rotary magnetic scanner depicted by Figure 26.

The rotary pickup illustrated in Figures 20, 21, and 22 and the rotary scanner illustrated by Figures 23, 24, and 25 (about to be described) both utilize very small diameter spaced pins of Mumetal. The total mass of these pins (whose diameters may be only .010" or .015" and whose lengths may be .100" or even less) is vastly less than that of the rotated Mumetal laminations provided in the rotary scanners illustrated in Figures 12, 13, 15, 16, 17, 18, and 20 of this disclosure. Thus the magnitude of the unwanted signal generated by the rotated Mumetal elements continuously cutting stray lines of flux is substantially much less when small isolated Mumetal scanning pins are used instead of strips or laminations of Mumetal having comparatively large mass and area.

Although a tape feed mechanism is not shown in Figures 20, 21, and 22, it will be understood that at pre-selected instants the tape is advanced downward as viewed in Figure 20 in increments of K which is the pitch or separation between groups of traces measured parallel to the axis of the control tape. Each advancement of the tape brings a new set of magnetized traces (arranged along a straight line lying transverse to the tape length) into exact register with the laminations 142 and 143. The traces remain in such registry as long as it is desired to translate the position of the magnetized areas relative to the axis or edges of the control tape into an alternating E.M.F. signal whose phase is an index of said displacement. After a predetermined time, the tape is rapidly moved downward by the distance K to bring the next set of magnetized traces into registry with the two laminations 142 and 143.

The control record is extremely well adapted to serve as storage for displacement intelligence which upon being "played back" or reproduced at any predetermined time can control the displacements of such elements as the slidable or rotatable members of such fabricating machines as drill-presses, gear generators, boring mills, arc welders, and other devices where the control of the rate of displacement of the slidable or rotatable members is of no importance as they are discontinuously but accurately moved to a new position. An example of such a control might be a drill press in which it is desirable to automatically move the drill spindle in a discontinuous manner as a series of holes lying in a certain pattern are being accurately located in an entirely automatic manner and then drilled.

Figures 23, 24, and 25 illustrate another type of synchronously rotated magnetic pickup. Like the magnetic pickup just described, this pickup utilizes small diameter scanning pins 165 made of Mumetal or other material having high permeability at low flux densities. From Figure 23 it will be seen that the axis of the radially extending pins are arranged along a helix whose pitch as in the explanation of the other rotary pickups can be taken to be exactly .050". The pins are arranged along straight lines which are parallel to the axis of rotation of a cylinder 164 in which they are accurately mounted. Figure 24, an end elevation of Figure 23, indicates that the rows of scanning pins are located at 15° intervals about the periphery of the cylinder, there being 24 rows of pins. The cylinder 164 is closed at its left-hand end as viewed in Figure 23. The inside and outside diameters of the cylinder, which is preferably made of "Pyrex" glass, porcelain, or certain plastics having high mechanical stability with non-magnetic conducting properties, are very accurately ground to ensure perfect concentricity, uniform wall thickness, and dynamic balance. A series of accurately located holes are drilled through the peripheral shell of the cylinder 164 in the configuration described. The scanning pins whose lengths are precisely equal to the wall thickness (.100" for example) of the cylinder are cemented in the holes so that their ends are flush with the inside and outside diameter surfaces of the cylinder. A two-pole, synchronous motor 160 is supplied with 60-cycle alternating current through leads 161 and 162. The cylinder is mounted absolutely concentric and integral to the rotor shaft 163 of the motor.

A stationary saddle 220, Figure 24, preferably made of bronze or other magnetic nonconducting metal or plastic, serves as a slidable support to the recorded control tape 175. A feed mechanism (not shown) is provided to draw the tape continuously downward as viewed in Figures 23 and 24 at preselected speeds during the operation of the pickup. From Figure 23 it will be seen that the recording tape has traces of continuous type similar to the tapes shown in Figures 8 and 18. The tape 178 is so supported by the saddle 220 that a clearance or air gap of .001" or less is maintained between the upper surface of the tape and the outside peripheral surface of the cylinder. Figure 25 illustrates part of the wall of the cylinder 164 broken away in order to show the position of a row of scanning pins at the instant they are in register with lamination 171 and also to show the outline of the upper part of this lamination which extends into the cylinder. It will be noted from this figure that the lower horizontal edge is in exact parallelism with the inside surface of the cylinder 164. The lamination 171 is rigidly supported by being clamped in a slot (not shown) provided for it in the saddle 220 in such a manner that a clearance or air gap of .001" or less is maintained between the revolving surfaces of the inside diameter of cylinder 164 and the upper horizontal edge of the lamination. The upper horizontal edge of the lower section of the C-shaped lamination is flush with the tape supporting surface of the saddle 220. An induction coil or element 170 consisting of thousands of turns of fine insulated magnet wire is wrapped on a nylon or other plastic bobbin 168. The coil is so arranged that lamination 171 passes through it so that any flux threading the lamination causes an E.M.F. to be induced in the coil windings. The ends of the winding are brought out and soldered to two shielded cables 166 and 167, Figure 23.

The operation of the scanning device just described will now be dealt with. Synchronous motor 160 is energized to cause cylinder 164 to be continuously rotated at 60 r.p.s. in the direction shown in Figure 24. With the recording tape 178 stopped (for purposes of description) the scanning pins will be displaced in a direction from left to right as viewed in Figure 23 over the magnetized traces 176 at the rate of one trace per revolution or 60 traces per second. At the same time, 24 consecutive rows of scanning pins 165 will be brought into exact register with the stationary lamination 171 per revolution. The duration of such registry is very short since each pin passes through an angle of 1° in $$\frac{1}{21,600}$$

part of a second or in less than 50 microseconds. Since magnetic flux from the magnetized traces impressed on tape 178 threads the circuit comprised of lamination 171 and scanning pins 165 only at those instants that there is close proximity between these elements the flux picked up from the traces magnetically impressed on the recording tape will be completely interrupted 24 times per revolution or 1440 times per second. Due to their arrangement on a helix, each row of spaced scanning pins is consecutively displaced in a left to right direction transverse to the tape axis in increments of $$\frac{.050}{24}$$

or .0028" where .050"=the pitch of the helix and 24=the number of rows of scanning pins. By this incremental scanning of the magnetized traces at the rate of 1 trace per revolution or 60 traces per second (with the tape stationary) it will be seen that the high frequency 1440 c.p.s. signal output of the induction coil 170 is modulated at 60 c.p.s. as illustrated generally in Figure 14.

It will be apparent that the phase of the current generated in the coil 170 will be varied in accordance with the transverse displacement of the traces 176 in the same general manner in which a varying phase is produced in Figures 8 through 19, respectively.

Figure 28:
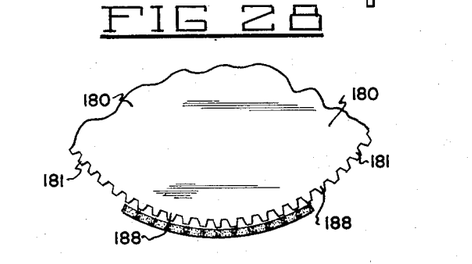
Figure 28 is a broken section of the rotary flux sensing element used in the magnetic scanner illustrated by Figures 26 and 27.

Figures 26, 27, and 28 show another type of rotary scanner whose magnetic flux pickup elements are arranged about the periphery of a disk like the teeth of a spur gear instead of in a spiral or helical array. The rotated element itself, a pickup disk 180, is made of Mumetal or other material having high permeability at low flux-densities. Although the figures illustrate the element to be of considerable thickness, it should be made of stock not in excess of .020" or .030" in thickness. A series of identical equidistantly spaced teeth 181 are accurately milled about the disk's periphery as illustrated. The number of teeth for purposes of description will be taken to be 120 while their circular pitch will be assumed to be exactly .050" which is the pitch arbitrarily used in describing the former pickups. The outside diameter of the disk 180 will therefore be 1.910". A conductor 193, also made of Mumetal, is provided with a very narrow slot at its upper end as shown in Figure 27. An air gap of .001" or even less is maintained between the revolving surfaces of the disk and the stationary surfaces of tines 207 and 208 integral to the conductor which, from Figure 27, will be seen to straddle the disk. A two-pole, synchronous motor is supplied during the operation of the device with 60-cycle alternating current through the conductors 183 and 184. The pickup disk 180 is mounted concentric and integral to the rotor shaft 185.

An induction coil 205 consisting of thousands of turns of fine magnet wire is wound on a spool 190 of nylon or similar plastic. From the illustrations, it will be understood the coil 205 is placed around the conductor. A length of control tape 188 is slidably supported by the wide lower section of conductor 193. From Figure 26 it will be seen that the upper edge of this lower section is so shaped as to bend the recording tape (shown in cross-section in this figure) to conform very closely to the radius of the pickup disk 180. From Figure 28 it will be noted that a clearance or air gap is continuously maintained between the peaks of teeth 181 and the upper surface of the recording tape. This clearance will be assumed to be .0010". The tape is guided by two rotatable rollers 200 and 201 seen at the extremes of Figure 27. Two identical guide blocks 202 serve to give the tape the slight camber or trough shape shown in Figures 26 and 28. Although there is no plan view (similar to Figures 8, 18, and 23) of the magnetized tape 188, it will be understood that this tape is generally identical to the tapes shown in those figures. Therefore, the pitch of the traces magnetically impressed along the length of tape 188 will be understood to be .050" which, as stated, is the circumferential pitch of the teeth 181.

To operate the device, 60-cycle alternating current is led to the windings of motor 182 through leads 183 and 184 to cause the pickup disk to be rotated at 60 c.p.s. Simultaneously, a tape feed mechanism (not shown) is energized to continuously draw the tape in a direction from right to left as viewed in Figure 27. When the teeth 181 are in exact register with the centers of magnetic traces of north polarity impressed along the tape length as shown by Figure 28, maximum flux of north polarity will flow through the teeth 181 to the conductor 193 and thence back to the magnetized traces which closes the magnetic circuit. However, when the teeth are advanced by exactly one half pitch (from their position illustrated by Figure 28) or by the distance of .025 measured transverse to the length of recording tape 188, they will be in precise register with traces of south polarity. This flux will thread the magnetic circuit in a reverse direction. In this manner magnetic flux passing through the windings of pickup coil 205 will be controlled in more or less a sinusoidal manner. Since, as stated, there are 120 teeth peripherally disposed about the circumference of the pickup disk which is continuously rotated at 60 r.p.s., it will be seen that with the tape stationary the coil 205 will inductively generate a pulsating E.M.F. of 120×60 or 7,200 c.p.s. However, if three traces per second are displaced transverse to the tape length and in a direction opposite to that of the pickup disk's rotation, an alternating E.M.F. signal of 7,200+3 or 7,203 c.p.s. will be picked up by the pickup coil 205. Conversely, if the same number of traces are oppositely displaced per second, the signal output of the pickup coil will be as pulsating E.M.F. whose frequency is 7,200—3 or 7,197 c.p.s.

Thus it will be seen that, although a very high frequency signal output results from the use of the toothed rotary pickup in comparison with the other scanning devices whose flux pickup elements are arranged in a helical or spiral, all continuously rotated magnetic scanners herein described instantly convert any transverse displacements of magnetized traces into a corresponding phase displacement of the alternating signal output.

Although not illustrated in the drawings, it will be understood that the magnetic pickup devices should all be most carefully shielded against stray magnetic fields by the use of well designed shields capable of also reducing electro-static fields as well. Efficient shields, as is well known to those skilled in the art, may be made of Mumetal or other materials having high permeability at low flux densities arranged in two or more laminations with sheets of thin, dead, soft copper sandwiched in between to minimize electro-static fields.

While it will be realized that I have disclosed several complete and operative forms of my invention, I wish it to be understood that this showing is illustrative of the invention and is to be taken in a more or less diagrammatic sense, and that there are many modifications falling within the scope and spirit of the invention which will be apparent to those skilled in the art. The scope of the invention, therefore, should be limited only by the scope of the hereinafter appended claims.

For example, where I have shown flux transmissive pickup elements in a single curve, it will be apparent that a double curve, as in the case of a double threaded pickup screw, or other multiple curves on the pickup element may be readily employed. Whereas I have alluded to alternate traces on the tape as being north and south in polarity in certain embodiments, it will be apparent that, if desired, certain traces may be given a certain polarity and the intermediate traces maintained at neutral polarity, the essential feature being that alternate traces be magnetically differentiated. So too, whereas I have set forth dimensions of my assemblies and certain rates of rotation, it will be apparent that these may be varied widely as long as the over-all relationship between the several component elements remains as set forth.

The use and operation of my device are as follows:

In each of the devices shown, a control record is provided with a plurality of traces which are adapted to be displaced in directions transverse to the movement of the record to represent intelligence or data for a control system. For example, the displacement of the traces may be proportional to the desired displacements of a working member such as the carriage of a lathe or the like. On the other hand, the displacement of the traces may be readily employed to govern various stages in a process control (temperature, pressure, etc.) with a different displacement of the traces being equivalent to a different operation in the process. In Figure 20, for example, I disclose a series of parallel traces that are interrupted throughout their length in order that varying displacements of the traces can accurately serve to actuate suitable mechanisms in a process control in a step by step manner. If desired, a single trace may be advantageously employed where the transverse displacements of the trace is less than the width of the control tape or record.

In each of the forms of the invention herein disclosed, the parallel channels or traces are adapted to transmit magnetic flux to a sensing mechanism. In Figures 1–7, for example, driving coils are adapted to transmit magnetic flux to the channels and the channels transmit the magnetic flux to the rotary pickup or scanning device. In the other figures, the parallel channels are magnetized prior to the initiation of operation of the assembly so that the channels themselves are continuously adapted to give off or transmit magnetic flux or lines or force which may be termed "leakage flux." I employ rotary scanners which have a plurality of magnetic flux sensitive elements which are spaced in increments equal to the spacing of the parallel traces. These elements are arranged in each of the forms of the invention shown so that they form a scanning pattern which may be continuously or intermittently moved across the parallel traces and receive magnetic flux which is then transmitted through suitable magnetic circuits to an induction device or coil which relays the signal received to a suitable mechanism for actuating the member or members controlled. In Figures 1 through 8, for example, I disclose a rotary scanner in the form of a helical screw. The body of the screw itself, in these figures, serves to transmit magnetic flux to the induction coil or device and the threads formed on the member serve as the plurality of spaced flux transmissive elements or pickups which receive magnetic flux from the traces for transmission to the induction coil. Continuous rotation of these pickup elements formed as helical screws provides a continuous scanning effect. That is to say, continuous rotation of these members causes a continuous movement of the flux transmissive elements or pickups across the parallel traces on the record. In Figure 12, the rotary scanner takes the form of a rotary body which will not transmit magnetic flux. However, a series of flux transmissive elements 57 are spaced about the axis of rotation of the member and are adapted to receive magnetic flux from the traces and transmit that flux to an induction coil 59. Each of the flux transmissive elements 57 is magnetically isolated from one another and each is provided with a series of teeth 57t which are spaced in increments equal to the spacing of the parallel traces. The individual teeth in each of the flux transmissive elements are so arranged that the teeth of all of the flux transmissive elements form a helical curve about the axis of rotation of the body, and in the same general manner that the threads on the pickup device of Figures 1 through 8 are formed in a helical curve. In this manner, the curve generated by all of the teeth of the flux transmissive elements formed in the rotary scanner continuously moves across the parallel traces during continuous rotation of the member. In Figures 15, 16, and 17, I again show a rotary scanner having a plurality of flux transmissive elements 105 disposed in equal axial spacing with respect to the axis of rotation of the scanner itself. In this form of the invention the axis of the rotary scanner is disposed vertically and a series of teeth spaced at increments according to this spacing of the flux transmissive traces are formed in each of the flux transmissive elements. The teeth of all of these elements are arranged so that a spiral curve is generated about the axis of rotation of the scanner, the teeth of the individual elements appear to move across the channels of the record in a continuous manner. In the form of the invention shown in Figures 15–19, I have illustrated how one rotary scanning device may scan two separate groups of lanes or traces on the record to transmit magnetic flux to two separate induction coils. In Figures 20–22, I again disclose a rotary scanner having a vertical axis of rotation similar to the rotary scanner shown in Figure 15. In this form of the invention, however, a series of magnetically isolated elements 126 are disposed on radial lines with respect to the axis of rotation of the scanner. These individual elements generate a spiral curve about the axis of rotation of the scanner. In this manner, the curve generated by the individual elements 126 continuously moves across the parallel traces during rotation of the scanner. In this form of the invention the channels themselves are interrupted throughout their length so as to emphasize the use of the invention as a process control where step control may be desired. In Figures 23–25, I have disclosed a rotary scanner having an axis of rotation parallel to the plane of the recording element. In this form of the invention, a series of magnetically isolated elements 165 in the general form of pins are disposed about the axis of rotation of the rotary scanner so as to generate a helical curve about the axis of rotation in the same general manner that a helical curve is generated by the threads of the scanners of Figures 1 and 8. The elements 165 are again so disposed that, during rotation of the scanner, the curve formed by the elements appears to move across the parallel traces, receive magnetic flux from the channels, and transmit the variable flux to the induction device 170. Figures 26–28, inclusive, illustrate another form of the invention utilizing my principles of scanning. In this form of the invention, the scanner is in the form of a disk 180 having a series of equally spaced teeth disposed around the periphery of the disk. The teeth are spaced to the same extent as the spacing of the parallel traces on the control record. During continuous rotation of the disk, the teeth on the scanner continuously move across the parallel traces to receive magnetic flux from the traces and transmit the variable flux to the induction device 205.

In Figures 1–7, the rotary scanner is adapted to be intermittently actuated to control the magnitude of magnetic flux from the traces on the control record although it will be apparent that, if desired, the scanner may be continuously rotated. In Figures 1–7, the spatial relationship of the spaced flux transmissive elements or pickup in the form of threads on the scanner, to the parallel traces on the control tape or record produces a varying output signal in the induction coil. It will be apparent that the reluctance between the flux transmissive elements and traces is varied in accordance with the displacement of the traces and the rotation of the scanner to produce a varying output signal.

In Figures 8–28, the rotary scanners are adapted for continuous rotation. The traces on the control record are magnetized north, for example, and the areas between the traces are magnetized south, although it will be apparent that, if desired, certain traces may be magnetized in one direction, and the intervening spaces or areas between the traces may be left unmagnetized. The rotary scanners of Figures 8–28 are continuously rotated so that the flux transmissive elements or pickups of each of these figures continuously move across the traces of the control record. If it is assumed that the traces are not displaced with respect to the direction of the movement of the record, a signal of constant frequency will be produced in the induction coil or induction device of each of these figures since the flux transmissive elements of each of these rotary scanners moves across the traces at a constant rate of speed proportional to the rate of rotation and will be alternately receiving north lines of force or south lines of force or no lines of force as the case may be. When the traces on the control record are displaced, however, the flux transmissive elements on the rotary scanners will move across more or less traces according to the direction of displacement of the traces. When the rotary scanners move across more or less of the traces than the number of traces when the traces are not displaced, a variance of phase of the signal will be sensed by the induction coil in proportion to the number of traces displaced. The magnitude of this variance in phase will be proportional to the magnitude of displacement of the traces. It will be understood that a phase shift or displacement in the voltage will result from relative displacement of the traces from instant to instant. In Figure 20, for example, I have disclosed a form of record wherein a phase shift can be used to control a certain step in a process. In Figure 20 the traces are discontinuous so as to present groups of traces displaced in different amounts with respect to the axis of the control rcord. If it is assumed that the scanner is moving across one series of these traces, a certain phase of signal will be sensed by the induction coil. If, however, the record is shifted so as to present the next series of traces which are displaced a different amount than the preceding series of traces, the flux transmissive elements of the scanner will be in a different position relative to the series of traces than they were with respect to the preceding series of traces. The starting points of the alternating signal will therefore be shifted along a time axis in electrical degrees proportional to the actual physical displacement of the traces which results in a phase shift in the signal derived.

In each form of the invention, the scanning members serve to regulate the flux from the storage member. Each scanning member has alternate areas thereon of different flux-transmissive characteristics. The teeth of the scanners act as areas of maximum transmissibility or minimum flux-suppressing areas while the spaces between the scanners act as areas of minimum transmissibility or maximum flux-suppressing areas.

In each of the forms of the invention shown, the induction coil associated with the assembly always receives a signal from the assembly. If the scanner is intermittently actuated as in Figures 1-7, the relationship of the flux transmissive elements or threads on the scanner to the positions on the traces establishes the magnitude of the continuous signal. In the form of the invention shown in Figures 8-28, the scanners are continuously rotated to produce a continuous cyclic signal, the phase displacement of which is dependent from instant to instant upon the relative displacement of the traces at any given instant.

I claim:

1. A record sensing assembly including a record having a plurality of magnetized traces variantly displaced transversely to a reference edge of the record for controlling the desired movements of a member, a rotary sensing device positioned adjacent the record for sensing the direction of movement of the traces, said rotary sensing device including a plurality of spaced magnetic flux-sensitive elements, said spaced elements being formed and adapted to transmit magnetic flux from said traces to a controlling mechanism for the member.

2. A record sensing assembly including a record having a magnetized trace thereon, said magnetized trace being adapted to represent controlled movements of a member, a rotary sensing device positioned adjacent the record for sensing the direction of movement of the trace, said rotary sensing device including a plurality of spaced magnetic flux-sensitive elements in the form of a helical curve generated around the axis of rotation of the sensing device, said spaced elements being formed and adapted to transmit magnetic flux from the trace to a control mechanism for the member.

3. A record sensing assembly including a record having a plurality of magnetized traces thereon, said magnetized traces being adapted to represent controlled movements of a member, a rotary sensing device positioned adjacent the record for sensing the direction of movement of the traces, said rotary sensing device including a plurality of spaced magnetic flux-sensitive elements in the form of a helical curve generated around the axis of rotation of the sensing device, said spaced elements being formed and adapted to transmit magnetic flux from the traces to a control mechanism for the member.

4. A record sensing assembly including a record having a trace thereon adapted to transmit magnetic flux and representing controlled movements, a sensing device positioned adjacent said record, said sensing device having a plurality of flux transmissive elements adapted to receive magnetic flux from said trace, an induction coil adapted to transmit electrical energy to a working member, said induction coil being in a magnetic circuit with said elements, said flux transmissive elements being movable in transverse directions with relation to said trace for inducing a variable signal in said coil.

5. A record sensing assembly including a record having a plurality of magnetized traces thereon representing controlled movements, a sensing device positioned adjacent said record, said sensing device having a plurality of flux transmissive elements adapted to receive magnetic flux from said traces, said flux transmissive elements being spaced in equal increments with relation to the spacing of said traces, an induction element adapted to transmit electrical energy to a working member, said induction coil being in a magnetic circuit with said elements, said flux transmissive elements being movable with relation to said traces for inducing a variable current in said coil.

6. A record sensing assembly including a record having a magnetized trace thereon representing controlled movements, a sensing device positioned adjacent said record, said sensing device having a plurality of flux transmissive elements adapted to receive magnetic flux from said trace, said flux transmissive elements being positioned to provide a variable reluctance gap between the elements and said trace, an induction element in magnetic circuit with said sensing device adapted to transmit electrical energy to a working member, said flux transmissive elements being movable with relation to said trace for varying the reluctance between said trace and said elements and inducing a variable signal in said induction element.

7. A record sensing assembly as recited in claim 4 wherein said sensing device is in the form of a helical screw having threads serving as flux transmissive elements.

8. A record sensing assembly as recited in claim 4 wherein said sensing device is formed of a non-magnetic flux sensitive body having a plurality of magnetic flux sensitive elements equally spaced within said body.

9. A record sensing assembly as recited in claim 4 wherein said sensing device is formed by providing a rotary body having an axis of rotation transverse to said record with a plurality of flux transmissive elements spaced around the axis of rotation of said body.

10. A record sensing assembly as recited in claim 4 wherein said sensing device is in the form of a rotary non-magnetic flux transmissive body having a plurality of magnetically isolated flux transmissive elements spaced around the axis of rotation of said body.

11. A record sensing assembly as recited in claim 4 wherein said sensing device is in the form of a rotary body having a plurality of magnetically isolated flux transmissive elements having equal axial spacing around the axis of rotation of said body.

12. A record sensing assembly as recited in claim 4 wherein said sensing device is in the form of a rotary body having a plurality of magnetically isolated flux transmissive elements having equal axial spacing around the axis of rotation of said body, each flux transmissive element including a plurality of spaced teeth, the teeth of said elements being positioned to generate a helix about the axis of rotation of said body.

13. A record sensing assembly as recited in claim 4 wherein a plurality of parallel magnetized traces are provided on said record and said sensing device is in the form of a rotary body having a plurality of flux transmissive elements spaced equally about the axis of rotation of said body with the spacing between said flux transmissive elements being equal to the spacing between said magnetized traces.

14. A record sensing assembly including a record having a plurality of spaced parallel magnetized traces thereon representing controlled movements, a sensing device positioned adjacent said record, said sensing device including magnetic flux sensitive portions disposed in the form of a curve having convolutions spaced in the same amounts as said parallel traces and disposed adjacent said traces, an induction element in a magnetic circuit with said flux sensitive portions for receiving an induced current from said portions, said portions being movable with relation to said traces for varying the induced current in said element.

15. A record sensing assembly including a record having a magnetized trace thereon adapted to transmit magnetic flux, a rotary scanner positioned adjacent said record, means for continuously rotating said scanner, said scanner having a plurality of magnetic flux sensitive portions adapted during rotation of said scanner to move across said trace and receive magnetic flux in an amount proportional to the distance of said trace from one of said portions, and an induction element magnetically associated with said portions whereby the magnetic flux received by said element is dependent upon the spatial relation of said trace to said portions.

16. A record scanning assembly including a record having a trace thereon adapted to transmit magnetic flux and displaced in variant amounts with respect to the direction of movement of the record for representing particular desired movements, a rotary scanner positioned in record sensing relation to said record, said scanner including a plurality of magnetic flux transmissive elements adapted for continuous traversal of said trace during continuous rotation of said scanner.

17. A record scanning assembly as recited in claim 16 wherein the axis of the scanner is parallel with the plane of the record and perpendicular to the direction of movement of the record.

18. A record scanning assembly as recited in claim 16 wherein the axis of the scanner is perpendicular to the plane of the record.

19. A record scanning assembly as recited in claim 17 wherein the axis of the scanner is parallel to the direction of movement of the record.

20. A record scanner for use with a record having a generally elongated magnetized trace thereon representing a controlled movement including a rotary scanning body, a plurality of magnetic flux sensitive elements carried by said body, an induction device magnetically associated with said elements, said elements being spaced with respect to the axis of rotation of said body for continuous traversal of said trace during continuous rotation of said body.

21. A record scanning assembly as recited in claim 17 wherein the trace is interrupted throughout its length.

22. A record scanning assembly as recited in claim 17 wherein the record is provided with a plurality of channels with each channel having a magnetized trace therein, and said scanner is positioned in record sensing relation to each channel.

23. A variant cycle signal generating assembly including a storage member having a flux-transmissive area thereon, an induction element adapted to form a magnetic circuit for the passage of flux between said area and said element, a rotary scanner positioned adjacent said record, said scanner including adjacent portions having differential flux-sensitive characteristics and being magnetically associated with said area, the position of one of said portions over said area producing a signal of predetermined magnitude in said coil and the position of an adjacent portion over said area producing a signal in said element of a different magnitude, said portions being formed and adapted for continuous traversal of said trace during continuous rotation of said scanner, and means for moving said area in directions parallel to the direction of traversal, continuous movement of said portions with relation to said area resulting in a signal of predetermined frequency, additional relative movement between said area and said portions resulting in a phase change of the signal.

24. A signal generating assembly including a storage member having a plurality of areas of predetermined magnetic polarity thereon, there being spaces between the areas of different polarity, a movable scanner adjacent said areas, said scanner having a plurality of spaced elements of predetermined sensitivity to magnetic flux, said elements being spaced in accordance with the spacing of said areas there being spaces between said elements of a different sensitivity to magnetic flux, an induction element adapted to establish a magnetic circuit between said areas and said spaces between said areas, said induction element being formed and adapted to have a voltage induced therein, and means for varying the relative position of said elements and said areas in directions extending across said areas, the magnitude of the voltage induced in said element being regulated by the relative position of said spaced elements to said areas.

25. A signal generating assembly including a control member having a plurality of generally elongated traces of predetermined magnetic polarity thereon, there being spaces between the traces of different polarity, a movable scanner adjacent said member, said scanner having a plurality of spaced elements of predetermined magnetic flux characteristics, there being spaces between said elements of different magnetic flux characteristics, an induction element adapted to establish a magnetic circuit between said element, said traces and said spaces between said traces, said induction element being formed and adapted to have a voltage induced therein, the magnitude of the voltage induced in said element being regulated by the relative position of said spaced elements to said traces, and means for continuously traversing said traces with said elements.

26. A signal generating assembly including a control member having a plurality of traces of predetermined magnetic polarity thereon, there being spaces between the traces of different polarity, a movable scanner adjacent said member, said scanner having a plurality of spaced elements of predetermined sensitivity to magnetic flux, there being spaces between said elements of a different sensitivity to magnetic flux, an induction element adapted to establish a magnetic circuit with said traces and said spaces between said traces, said induction element being formed and adapted to have a voltage induced therein, the magnitude of the voltage induced in said element being regulated by the relative position of said spaced elements to said traces, means for continuously traversing said traces with said elements to thereby provide a frequency of said voltage proportional to the rate of traversal of said elements, and means for moving said traces in directions generally parallel to the direction of traversal of said elements to thereby cause a phase change in said voltage.

27. A signal generating assembly including a control member having a magnetized trace of predetermined polarity thereon, there being areas of different polarity adjacent said trace, a movable scanner adjacent said member, said scanner having a portion of predetermined sensitivity to magnetic flux, and an area of different sensitivity to magnetic flux adjacent said portion, an induction element adapted to establish a magnetic circuit with said trace and said areas on said member, said induction element having the voltage induced therein responsive to the relative position of said portion to said trace, and means for moving said portion and said area of said scanner across said trace and said areas on said member.

28. A scanning body for use with a control record having a plurality of generally parallel traces thereon variantly displaced with respect to an edge of the record in amounts proportional to desired movements, including a rotary scanning body having a plurality of spaced magnetic flux-sensitive elements, the spacing of said elements corresponding to the spacing of said traces, the areas between said elements having a different sensitivity to magnetic flux than said elements.

29. An apparatus for generating a cyclic signal from a control member including such a control member with a longitudinally disposed magnetized trace of predetermined polarity on said member and an adjoining longitudinally disposed trace of different polarity on said member, an induction element, means for establishing a magnetic circuit between said trace, said adjoining trace and the induction element whereby a path of flux is maintained between said trace, said adjoining trace and said element, and means varying the voltage induced in said element by alternately restricting the flux in said magnetic circuit to thereby produce a cyclic signal, including means for establishing relative motion between the control member and the induction element.

30. A device for producing a predetermined phase change in a cyclic signal including an induction coil, and a control member with a series of generally parallel flux-transmissive traces, means for establishing a magnetic circuit between the induction coil and the series of generally parallel flux-transmissive traces on the control member, means for moving a series of flux-regulating members across said traces at a predetermined rate to thereby generate a signal of a frequency corresponding to the rate of movement of said members with relation to said traces in said coil, and means for moving said traces with respect to said members to thereby produce a phase change in the signal proportional to the extent of movement of said traces.

31. A signal generator including a storage member having a magnetized area recorded thereon, a magnetic circuit through which flux from said area flows including a ferromagnetic structure and a movable scanner adjacent said area, said scanner having a plurality of spaced flux-sensitive elements, an induction device associated with said magnetic circuit, and means for continuously displacing said flux-sensitive elements in and out of magnetic association with said magnetized area, whereby a cyclically varying E.M.F. is generated in said induction device whose frequency is proportional to the rate that said flux-sensitive elements scan said magnetized area.

32. A signal generator adapted to translate leakage flux from a magnetized area impressed on a storage member into a cyclically varying signal comprising a core structure magnetically coupled to said storage member, a rotary scanner having a plurality of spaced ferromagnetic elements in magnetic association with said storage member and said core structure, an induction device through which flux from said magnetized area flows, and means for continuously moving said spaced elements across said area whereby a pulsating signal is generated in said induction device whose frequency from instant to instant is an exact index of the rate said spaced elements are displaced across said magnetized area.

33. A signal generator adapted to translate the physical displacement of a trace magnetically impressed on a storage member into a phase displacement whose magnitude and sign is an index of the magnitude and direction of said physical displacement, comprising a magnetic storage member having a magnetic trace variantly displaced thereon, a ferromagnetic structure in magnetic association with said storage member, a movable scanner having spaced low-reluctance elements immediately adjacent to and magnetically coupled to said storage member, an induction device coupled to said ferromagnetic structure, and means for displacing said scanner to cause said spaced elements to continuously traverse said trace whereby a pulsating E.M.F. signal is generated in said induction device whose frequency in an index of the rate that said spaced elements scan said trace and whose phase is an exact index of the physical displacement of said trace from instant to instant.

34. A device for sensing flux magnetically impressed on a storage member which is magnetically coupled with a ferromagnetic loop, a movable scanner having a plurality of spaced low-reluctance elements, means for displacing said scanner across said storage member to alternately magnetically couple and uncouple said spaced elements to said flux in a continuous manner to cause flux threading said ferromagnetic loop to be cyclically varied, and means for translating the variations into an alternating signal whose frequency is proportional to the rate that said spaced elements scan said flux.

35. A device for translating leakage flux from a trace magnetically impressed on a storage member into a cyclically varying signal generated by an induction device which consists of means for coupling said leakage flux to a magnetic circuit, means for scanning said trace by spaced low-reluctance elements separated by high reluctance elements whereby the magnitude of the flux is cyclically varied, and means for translating said variations into a cyclically varying signal whose frequency is proportional to the rate said trace is scanned by said elements.

36. A structure for sensing and modulating leakage flux from a magnetized trace of predetermined polarity and from an adjoining area of different polarity impressed on a storage member including such a storage member, a magnetic circuit in association with said trace and said area, means for causing said storage member to be continuously scanned including a pattern comprised of spaced alternate flux-suppressing and nonsuppressing areas for regulating in a cyclic manner the magnitude of leakage flux threading through said magnetic circuit by said scanning pattern, and means for translating the cyclically varying flux into a cyclically varying signal modulated at a frequency proportional to the rate said magnetized trace is scanned.

37. A magnetic record assembly including a movable magnetic flux-sensitive record having a magnetized area thereon and a magnetic circuit associated with said record including a member having a movable magnetic flux-sensitive portion positioned adjacent said area and movable with respect to said area, and a stationary magnetic flux-sensitive member disposed adjacent said record to thereby establish a pattern of magnetic flux between said area, said first member and said second member being in predetermined relation to the position of said portion with respect to said area.

38. The structure of claim 28 further characterized in that the rotary scanning body includes a helical screw having threads functioning as the spaced magnetic flux sensitive elements.

39. The structure of claim 28 further characterized in that the rotary scanning body includes a non-magnetic flux sensitive body having a plurality of equally spaced magnetic flux sensitive elements.

40. The structure of claim 28 further characterized in that the rotary scanning body has its axis of rotation disposed generally transverse to the plane of the parallel traces.

41. The structure of claim 28 further characterized in that the magnetic flux sensitive elements are magnetically isolated.

42. The structure of claim 33 further characterized in that the rotary scanner includes a helical screw having threads functioning as the spaced ferromagnetic elements.

43. A record sensing assembly, including a record having a plurality of spaced generally parallel traces thereon, the traces having flux characteristics that differ from the flux characteristics of the areas between the traces, a movably mounted scanner positioned adjacent the record and having a plurality of scanning areas thereon spaced in the same general amount as the parallel traces, the scanning areas having flux characteristics that differ from the flux characteristics of the intermediate areas, an induction device in a magnetic circuit with the record and scanner for receiving an induced current therefrom, and means for moving the scanner relative to the traces on the record to vary the induced current in the induction device.

References Cited in the file of this patent

UNITED STATES PATENTS

| | | |
|---|---|---|
| 1,809,070 | Schapira | June 9, 1931 |
| 1,941,618 | Nemirovsky | Jan. 2, 1934 |
| 2,080,100 | Tauschek | May 11, 1937 |
| 2,188,650 | Clark | Jan. 30, 1940 |
| 2,307,965 | Sheperd | Jan. 12, 1943 |
| 2,351,595 | Bindschedler | June 20, 1944 |
| 2,537,770 | Livingston | Jan. 9, 1951 |
| 2,590,091 | Devol | Mar. 25, 1952 |
| 2,615,990 | Blaney et al. | Oct. 28, 1952 |
| 2,641,656 | Dicke | June 9, 1953 |